(12) United States Patent
Griffin, III et al.

(10) Patent No.: US 10,786,334 B2
(45) Date of Patent: *Sep. 29, 2020

(54) CERAMIC PROCESSING AND DESIGN FOR THE DIRECT MANUFACTURE OF CUSTOMIZED LABIAL AND LINGUAL ORTHODONTIC CLEAR ALIGNER ATTACHMENTS

(71) Applicant: LightForce Orthodontics, Inc., Cambridge, MA (US)

(72) Inventors: Alfred Charles Griffin, III, Boston, MA (US); Kelsey A Fafara, Watertown, MA (US)

(73) Assignee: LightForce Orthodontics, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/437,696

(22) Filed: Jun. 11, 2019

(65) Prior Publication Data

US 2019/0377327 A1    Dec. 12, 2019

Related U.S. Application Data

(60) Provisional application No. 62/683,816, filed on Jun. 12, 2018.

(51) Int. Cl.
*A61C 7/00* (2006.01)
*A61C 7/08* (2006.01)
(Continued)

(52) U.S. Cl.
CPC ............... *A61C 7/002* (2013.01); *A61C 7/08* (2013.01); *A61C 13/0004* (2013.01);
(Continued)

(58) Field of Classification Search
None
See application file for complete search history.

(56) References Cited

U.S. PATENT DOCUMENTS 4,639,218 A    1/1987   Jones et al.
5,879,156 A    3/1999   DeLeo
(Continued)

OTHER PUBLICATIONS

"Vickie Parrish Foster, An Overview of Dental Anatomy, 2019, dentalcare.com, " (Year: 2019).*

(Continued)

*Primary Examiner* — Santosh R Poudel
(74) *Attorney, Agent, or Firm* — Smith, Gambrell & Russell, LLP

(57) ABSTRACT

A method of manufacturing pre-formed, customized, ceramic, labial/lingual orthodontic clear aligner attachments (CCAA) by additive manufacturing (AM) may comprise measuring dentition data of a profile of teeth of a patient, based on the dentition data, creating a three dimensional computer-assisted design (3D CAD) model of the patient's teeth using reverse engineering, and saving the 3D CAD model, designing a 3D CAD structure model for one or more CCAA on various parts of each tooth, importing data related to the 3D CAD CCAA structure model into an AM machine, directly producing the CCAA in the ceramic slurry-based AM machine by layer manufacturing, enabling the provider to deliver patient-specific CCAA's by an indirect bonding method to the patient's teeth to improve the efficacy and retention of the clear aligners.

21 Claims, 22 Drawing Sheets

(51) Int. Cl.
| | |
|---|---|
| *A61C 13/00* | (2006.01) |
| *B33Y 50/02* | (2015.01) |
| *B29C 64/393* | (2017.01) |
| *G05B 19/4099* | (2006.01) |
| *A61C 7/14* | (2006.01) |
| *A61C 7/36* | (2006.01) |
| *A61C 7/16* | (2006.01) |
| *B33Y 80/00* | (2015.01) |
| *B33Y 10/00* | (2015.01) |
| *A61C 7/20* | (2006.01) |
| *B33Y 70/00* | (2020.01) |
| *B29K 33/00* | (2006.01) |
| *B29K 509/02* | (2006.01) |
| *B29L 31/00* | (2006.01) |

(52) U.S. Cl.
CPC ........ *A61C 13/0013* (2013.01); *B29C 64/393* (2017.08); *B33Y 50/02* (2014.12); *G05B 19/4099* (2013.01); *A61C 7/145* (2013.01); *A61C 7/148* (2013.01); *A61C 7/16* (2013.01); *A61C 7/20* (2013.01); *A61C 7/36* (2013.01); *A61C 13/0019* (2013.01); *B29K 2033/08* (2013.01); *B29K 2509/02* (2013.01); *B29L 2031/7532* (2013.01); *B33Y 10/00* (2014.12); *B33Y 70/00* (2014.12); *B33Y 80/00* (2014.12); *G05B 2219/35134* (2013.01); *G05B 2219/49007* (2013.01)

(56) References Cited

U.S. PATENT DOCUMENTS

| | | | |
|---|---|---|---|
| 6,217,322 B1 | 4/2001 | Kesling | |
| 7,347,688 B2 | 3/2008 | Kopelman et al. | |
| 7,698,014 B2 | 4/2010 | Dunne et al. | |
| 2002/0150857 A1 | 10/2002 | Orikasa et al. | |
| 2003/0165790 A1 | 9/2003 | Castro et al. | |
| 2003/0198911 A1 | 10/2003 | Knopp et al. | |
| 2005/0023710 A1 | 2/2005 | Brodkin | |
| 2005/0277082 A1 | 12/2005 | Christoff | |
| 2007/0207435 A1 | 9/2007 | Devanathan | |
| 2008/0015727 A1* | 1/2008 | Dunne | A61C 11/08 700/118 |
| 2008/0113311 A1 | 5/2008 | Forster | |
| 2010/0129764 A1 | 5/2010 | Pospisil | |
| 2010/0285419 A1 | 11/2010 | Cinader, Jr. | |
| 2010/0324715 A1* | 12/2010 | Yang | A61C 13/0018 700/98 |
| 2011/0309554 A1 | 12/2011 | Liska et al. | |
| 2011/0310370 A1 | 12/2011 | Rohner et al. | |
| 2011/0311933 A1 | 12/2011 | Parker | |
| 2012/0129120 A1 | 5/2012 | Foerster | |
| 2013/0029283 A1 | 1/2013 | Matty | |
| 2013/0081271 A1* | 4/2013 | Farzin-Nia | A61C 13/00 29/896.1 |
| 2013/0095446 A1* | 4/2013 | Andreiko | A61C 7/08 433/6 |
| 2014/0107823 A1 | 4/2014 | Huang | |
| 2014/0134562 A1 | 5/2014 | Wu et al. | |
| 2014/0170591 A1 | 6/2014 | El-Silblani | |
| 2014/0178830 A1 | 6/2014 | Widu | |
| 2015/0313687 A1 | 11/2015 | Blees | |
| 2016/0256240 A1 | 9/2016 | Shivapuja et al. | |
| 2016/0279869 A1 | 9/2016 | Gruber | |
| 2016/0299996 A1* | 10/2016 | Huang | G01B 11/24 |
| 2016/0346063 A1 | 12/2016 | Schulhof et al. | |
| 2016/0361141 A1* | 12/2016 | Tong | A61C 7/125 |
| 2017/0007360 A1 | 1/2017 | Kopelman et al. | |
| 2017/0007368 A1 | 1/2017 | Boronkay | |
| 2017/0231721 A1* | 8/2017 | Akeel | B29C 64/386 433/24 |
| 2017/0319296 A1 | 11/2017 | Webber et al. | |
| 2017/0333161 A1 | 11/2017 | Dinh | |
| 2018/0148378 A1* | 5/2018 | Mayr | A61C 13/0013 |

OTHER PUBLICATIONS

"Dr. Kyle Fagala, What is Indirect Bonding? And why should you care?, Nov. 20, 2014, Saddle Creek Orthodontics" (Year: 2014).*
"3D Printing / Additive Manufacturing Using Polymers—Complete Guide, URL: https://omnexus.specialchem.com/selection-guide/3d-printing-and-additive-manufacturing-polymers-and-processes?p=1" (Year: 2020).*
John C. Bennett, Fundamentals of Bracket Selection, 2nd ed. London, UK. 2010, pp. 14, 42.
William R. Proffit DDS PhD, Contemporary Orthodontics. 5th ed. St. Louis, MO. Mosby Elsevier; 2013, pp. 369, 374.
Wohlers Report 2001, Part 6, p. 144.
Interview with Johannes Homa, CEO of Lithoz GmbH, Advanced Manufacturing Insight, Aug. 11, 2014.
Silver M, Griffin AC, Jr., Azzopardi L, Masoud MI, Tokede O, Griffin AC, 3rd. Novel methods reveal that parallelism contributes to the functional vertical slot dimension in ceramic and metal brackets. The Angle orthodontist. Nov. 2018;88(6):812-818.
Krey KF, Darkazanly N, Kuhnert R, Ruge S. 3D-printed orthodontic brackets—proof of concept. Int J Comput Dent. 2016;19(4)351-362.
Non-final Office Action dated Aug. 13, 2019 received in U.S. Appl. No. 16/437,718.
Non-final Office Action dated Sep. 13, 2019 received in U.S. Appl. No. 16/437,728.
Cima et al., Slurry-Based 3 DP and Fine Ceramic Components (2001), Proceedings of the 12th Solid Freeform Fabrication Symposium, 216-223 http://sffsymposium.engr.utexas.edu/2001TOC (Year: 2001).
Wang et al., Solid Freeform Fabrication of Permanent Dental Restorations via Slurry Micro-Extrusion (2006). The America Ceramic Society, 346-349. (Year: 2006).
Written Opinion of the International Searching Authority dated Aug. 28, 2019 received in International Application No. PCT/US19/36558; (5 pages).
International Search Report dated Aug. 28, 2019 received in International Application No. PCT/US19/36558; (3 pages).
Written Opinion of the International Searching Authority dated Aug. 28, 2019 received in International Application No. PCT/US19/36557; (5 pages).
International Search Report dated Aug. 28, 2019 received in International Application No. PCT/US19/36557; (3 pages).
International Search Report dated Sep. 3, 2019 received in International Application No. PCT/US19/36556; (3 pages).
Written Opinion of the International Searching Authority dated Sep. 3, 2019 received in International Application No. PCT/US19/36556; (7 pages).
Final Office Action dated Mar. 31, 2020 received in U.S. Appl. No. 16/437,728.
Final Office Action dated Mar. 30, 2020 received in U.S. Appl. No. 16/437,718.

* cited by examiner

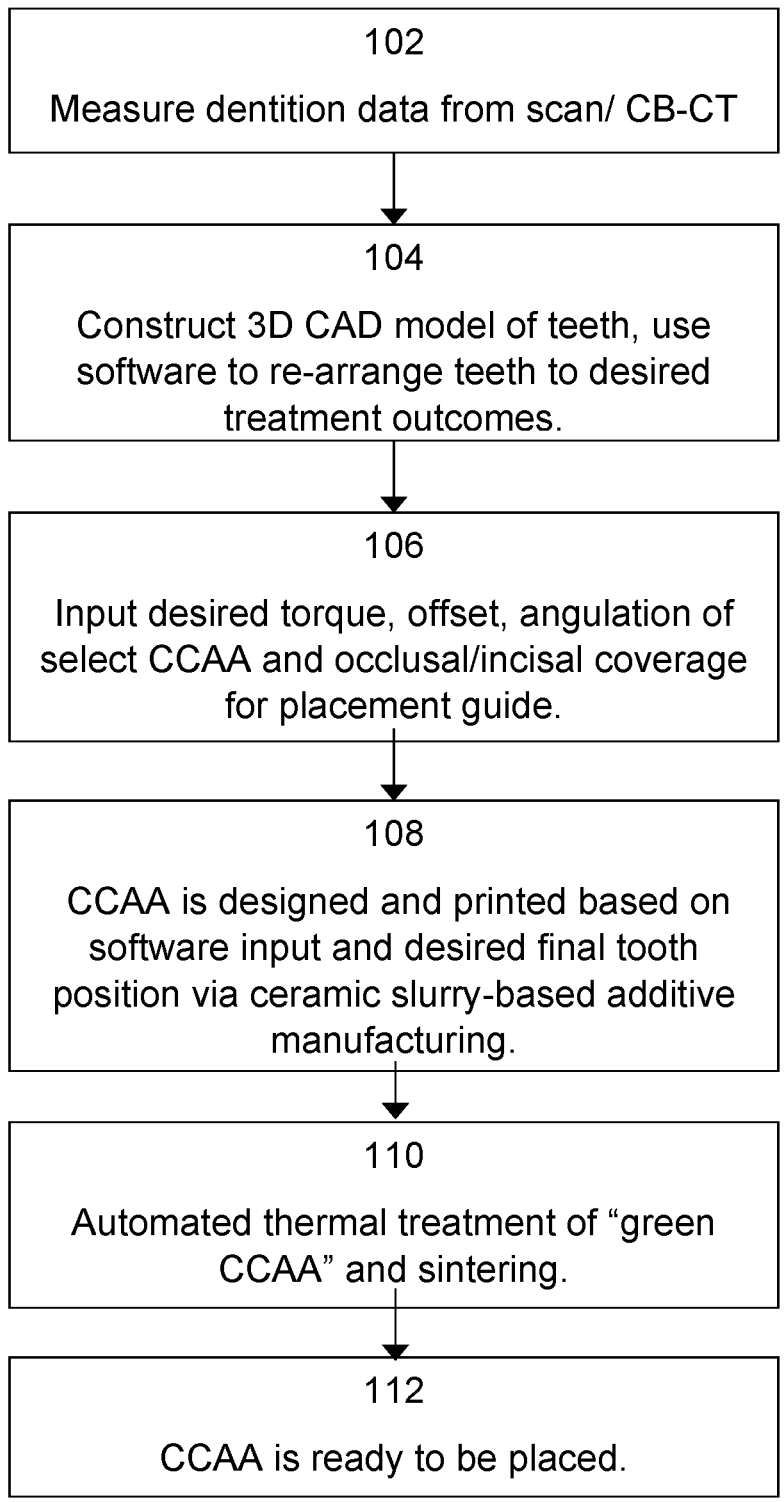

CERAMIC PROCESSING AND DESIGN FOR THE DIRECT MANUFACTURE OF CUSTOMIZED LABIAL AND LINGUAL ORTHODONTIC CLEAR ALIGNER ATTACHMENTS

CROSS-REFERENCE TO RELATED APPLICATIONS

This application claims the benefit of U.S. Provisional Application No. 62/683,816, filed Jun. 12, 2018, the contents of which are hereby incorporated by reference herein in their entirety.

BACKGROUND OF THE INVENTION

1. Field of the Invention

An embodiment of present invention relates generally to the manufacturing of ceramic labial/lingual orthodontic clear aligner attachments (CCAAs) that create added retention for clear aligners used for straightening the teeth and correcting malocclusion. More specifically, an embodiment of the invention relates to the methodology of direct manufacture of customized ceramic labial/lingual orthodontic clear aligner attachments by using a ceramic slurry-based additive manufacturing (AM) technology.

2. Description of the Related Art

A need arises for more efficient and accurate techniques for creating custom lingual and labial ceramic clear aligner attachments, and more aesthetic labial Clear Aligner Attachments (CAAs). Currently, CAAs for tray aligner treatment are fabricated from a variety of filled and unfilled, shaded, or translucent, bonding materials (such as dental composite) similar to that used to attach conventional orthodontic CAAs to teeth. They are formed by inserting this bonding material into a pre-designed and fabricated aligner-like tray that has the attachment mold included in its shape, and then using a bonding system similar to orthodontic CAA bonding to adhere the CAA to the teeth. This results in excess bonding material, or "flash" that then needs to be ground off with a drill in order to assure a proper fit of the subsequent orthodontic aligner trays. During the process of flash removal, often the attachment itself is inadvertently contacted by the drill bit and its shape is mistakenly altered, resulting in an unintentional CAA shape that doesn't conform as well with the aligner trays.

During the everyday insertion and removal of the aligner trays, the tray abrades the attachment in such a way as to actually alter the CAA's shape. Often, these attachments must be removed and replaced during aligner refinement procedures because of the significance of the wear on the CAA from this insertion and removal abrasion.

During the removal of CAAs made from bonding material, a high speed drill is utilized to grind off the CAA and remove any residual flash present on the tooth surface. This results in enamel also being removed from the tooth surface, as it is not within the technical ability of the dentist to adequately discern the boundary between the layer of bonding material and the enamel surface.

There is a need for more efficient and accurate techniques for creating custom lingual and labial ceramic clear aligner attachments that are more easily and accurately placed and more durable during active orthodontic treatment. After treatment, a more effective removal system of these attachments would include less polishing of the tooth surface with the unwanted side effect of damage to the enamel of the tooth.

SUMMARY OF THE INVENTION

The proposed invention utilizes Ceramic CAAs (CCAAs) that may be fabricated by ceramic slurry-based Additive Manufacturing (AM) and may be bonded to the tooth with an unfilled/filled bonding resin material already in use in dentistry. These CCAAs will be placed in an indirect transfer tray and then bonded to the teeth surfaces utilizing the unfilled or partially filled bonding resin.

An embodiment of the present devices and methods may be used to solve problems occurring in the current methods of creating resin-based CCAAs. For example, in one embodiment, it may provide a direct manufacturing method of customized lingual/labial CCAAs by utilizing any number of ceramic slurry-based AM technologies, examples of which may include digital light processing (DLP), laser photopolymerization stereolithography, jet printing (including particle jetting, nanoparticle jetting), layer slurry depositioning (LSD), or laser-induced slip casting. A slurry is defined as inorganic particles dispersed in a liquid, and may be photopolymerizable or may polymerize by other mechanisms. Likewise, similar methods may be used to create metal CCAAs wherein the inorganic materials in the slurry are metal. Examples of items that may be produced include customized labial/lingual CCAAs according to individual clear aligner (CA) retention needs on individual teeth, which may have direct tooth-matching retentive features designed into the CCAA base.

The present devices and methods may provide several advantages over the current methodology. 1) The removal of excessive bonding material will be significantly minimized—less filled resins may be used, which have a much thinner layer conformation than filled resins. 2) CCAAs will also result in a much more accurate and precise shape versus classical resin-based CCAAs, as variances in the thickness of the bonding material will not be able to result in variances in the shape of the CCAA. 3) The CCAA will not be able to be inadvertently damaged or altered in its shape by the post-placement flash polishing procedure because there will be less flash and the ceramic material of which the OA is fabricated will be resistant to indentation by accidental contact with the drill during the polishing/flash removal process. The CCAA will be more exact in its shape because it will be formed first, by Additive Manufacturing (AM), and then may be adhered with a thinner adhesive. This results in less variability of shape than the current procedures where the technique of placement can greatly vary the shape of the OA. 5) Most importantly, the OA will not be susceptible to deformation in shape due to abrasion from constant insertion and removal of the aligner trays because the ceramic OA is much more resistant to abrasion.

For example, in an embodiment, a method of manufacturing pre-formed, customized, ceramic, labial/lingual orthodontic clear aligner attachments (CCAA) by additive manufacturing (AM) may comprise measuring dentition data of a profile of teeth of a patient, based on the dentition data, creating a three dimensional computer-assisted design (3D CAD) model of the patient's teeth using reverse engineering, and saving the 3D CAD model, designing a 3D CAD structure model for one or more CCAA on various parts of each tooth, importing data related to the 3D CAD CCAA structure model into an AM machine, directly producing the CCAA in the ceramic slurry-based AM machine by layer manufacturing to form a patient-specific CCAA by an indirect bonding method, the patient-specific CCAA adapted to the patient's teeth.

In embodiments, the additive manufacturing machine may use a slurry-based process. The slurry-based process may include at least one of lithography-based manufacturing, inkjet printing, slip casting, laser lithography additive manufacturing, direct light processing, and selective laser melting. The CCAA may be made of an inorganic material with at least one component selected from a group of materials including an oxide ceramic, a nitride ceramic, a carbide ceramic, Aluminum Oxide (Al2O3), Zirconium Oxide (ZrO2), Alumina-toughened Zirconia (ATZ), Zirconia-toughened alumina (ZTA), Lithium disilicate, Leucite silicate and Silicon Nitride. The 3D CAD CCAA structure model may include data defining a fracture wall around a perimeter of a base of the CCAA. The fracture wall may have a thickness of about 10-about 150 μm, inclusive. The fracture wall may be adapted provide predictable fracture of the wall upon application of the normal force, enabling debonding of the CCAA through a combination of tensile and peeling forces. The normal force may be applied in at least one of a mesial-distal direction, an occlusal-gingival direction, or to any opposite corners. The combination of tensile and peeling forces may be less than a shear bond strength of a bonded CCAA. The 3D CAD CCAA structure model may include data representing at least a) the CCAA base (bonding area) that has recesses and/or undercuts into the bonding surface of the CCAA that are custom-shaped to fit the negative of a labial/lingual tooth surface, and contact a particular area of a tooth surface, c) a CCAA material, d) the particular tooth's profile, and e) a CCAA guide or indirect bonding jig to guide 3-dimensional placement of the CCAA onto the tooth. The ceramic slurry-based AM machine may comprise a molding compartment comprising a platform and a plunger to directly produce the CCAA by layer manufacturing, a material compartment, and an LED light source for digital light processing, wherein the CCAA is produced by layer manufacturing using slicing software to separate the 3D CAD CCAA structure model into layers and to get a horizontal section model for each layer so that a shape of each layer produced by the ceramic slurry-based AM machine is consistent with the 3D CAD structure data.

The ceramic slurry-based AM machine may comprise a vat adapted to hold the CCAA during manufacturing, a horizontal build platform adapted to be held at a settable height above the vat bottom, an exposure unit, adapted to be controlled for position selective exposure of a surface on the horizontal build platform with an intensity pattern with predetermined geometry, a control unit, adapted to receive the 3D CAD CCAA structure model and, using the 3D CAD CCAA structure model to: polymerize in successive exposure steps layers lying one above the other on the build platform, respectively with predetermined geometry, by controlling the exposure unit, and to adjust, after each exposure step for a layer, a relative position of the build platform to the vat bottom, to build up the object successively in the desired form, which results from the sequence of the layer geometries. The exposure unit may further comprise a laser as a light source, a light beam of which successively scans the exposure area by way of a movable mirror controlled by the control unit.

Directly producing the CCAA by layer manufacturing may further comprise in an apparatus comprising: a vat with an at least partially transparently or translucently formed horizontal bottom, into which light polymerizable material can be filled, a horizontal build platform adapted to be held at a settable height above the vat bottom, an exposure unit adapted to be controlled for position selective exposure of a surface on the build platform with an intensity pattern with predetermined geometry, comprising a light source refined by micromirrors to more precisely control curing, a control unit adapted for polymerizing in successive exposure steps layers lying one above the other on the build platform, controlling the exposure unit so as to selectively expose a photo-reactive slurry in the vat, adjusting, after each exposure for a layer, a relative position of the build platform to the vat bottom, and building up the CCAA successively in the desired form, resulting from the sequence of the layer geometries. The exposure unit may further comprise a laser as a light source, a light beam of which successively scans the exposure area by way of a movable mirror controlled by the control unit.

A scanning accuracy may be less than 0.02 mm. A manufacturing accuracy in the z-axis of the ceramic slurry-based AM machine may be from 5 to about 60 μm, and wherein the accuracy is achieved by using a between layer additive error compensation method based on an amount of polymerization shrinkage, to prevent errors in the CCAA base morphology. Manufactured layers of the CCAA may comprise a material selected from the group consisting of high strength oxide ceramics including Aluminum Oxide (Al2O3) and Zirconium Oxide (ZrO2) and may be mono- or polycrystalline filled ceramic. The CCAA may less than 4.00 mm thick from the nearest tooth bonding surface to its outer edges. The 3D CAD model may be saved as a 3D vector file format. The thickness of the manufactured layers is from 5 to 100 micrometers (μm) based on the resolution requirements of the CCAA for proper retention to the clear aligner. Different light curing strategies (LCSs) and depths of cure (Cd) are used. A selection of glass or oxide ceramic filler material for producing layers of the CCAA is based on different force demands.

BRIEF DESCRIPTION OF THE DRAWINGS

FIG. 1 is an exemplary flow diagram of an embodiment of a process for direct manufacturing of lingual or labial orthodontic attachments or attachment brackets.

DETAILED DESCRIPTION OF THE INVENTION

Figure 2A:
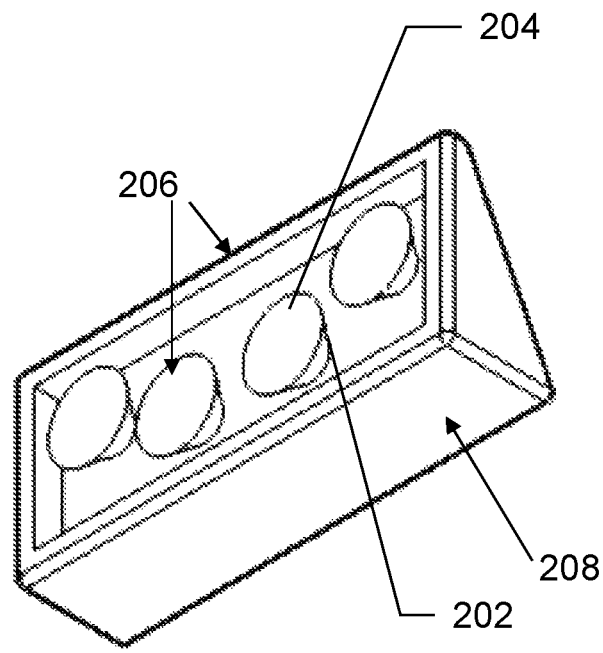
FIGS. 2a and 2b illustrate an example of an orthodontic attachment.

An embodiment of the present invention provides improved techniques for creating custom lingual or labial CCAAs.

An exemplary flowchart of an embodiment a direct manufacturing process 100 of lingual or labial orthodontic CCAAs by digital light processing is shown in FIG. 1. The process begins with 102, in which dentition data is measured and the parameters of the tooth profile are analyzed. For example, such measurement may use CT layer scanning a non-contact 3D scanner or an intra-oral scanner directly on the patient's teeth, or may use 3D readings on a teeth model previously cast or 3D printed using a coordinate measuring machine, a laser scanner, or a structured light digitizers. The scanning accuracy of such techniques is typically less than 0.02 mm. A manufacturing accuracy in the z-axis of the ceramic slurry-based AM machine may be from 5 to about 60 µm, and wherein the accuracy may be achieved by using a between layer additive error compensation method that predicts an amount of polymerization shrinkage.

In 104, based on the given dentition data, a 3D CAD model of the measured teeth is constructed based on the dentition data and saved in the computer in a typical file format, such as the .stl file format. The exterior structure of teeth is complicated, usually including irregular curves. The software may then be used to re-arrange the teeth in the model to the desired treatment outcomes that may be based on the long-axis of a tooth.

In 106, additional information, such as the desired shape and tooth location of the CCAAs are determined.

In 108, the CCAA is designed by the software or chosen from a list of options by the clinician based on the input 3D CAD model of the measured teeth, the model of the desired treatment outcomes, and the anticipated limitations of the CA and its ability to track on the teeth throughout treatment. The output of the design process may be a 3D CAD model. Such a 3D CAD model may be designed for a single lingual/labial CCAA structure, including the indirect bonding (IDB) tray.

3D CAD CCAA structure models of labial or lingual CCAAs may be designed by computer according to the orthodontic requirements, CA material considerations, and teeth morphology.

3D CAD CCAA structure models are processed to generate manufacturing control data for use by the production equipment. For example, where ceramic slurry-based AM equipment is used to produce the CCAAs, the software slices the 3D CAD CCAA structure models to separate it into thin layers and get the horizontal section model for each layer. Based on this section model, the ceramic slurry-based AM equipment can directly produce CCAAs, ensuring the shape of each layer is consistent to the 3D CAD structure data. For example, the thickness of such layers may be about 20 µm to about 50 µm (micrometers or microns) with a manufacturing accuracy of about 5 µm to about 60 µm by using between-layer additive error compensation.

Returning to 108 of FIG. 1, the 3D CAD CCAA structure model is transmitted to or imported into a ceramic slurry-based AM machine, such as a DLP machine and the ceramic CCAAs are produced. In the case of AM DLP or another ceramic slurry-based AM procedure, the CCAA may be produced by digital light processing directly.

Digital light processing (DLP) is another 3D additive manufacturing (AM) process that works by stacking layers of a photocurable resin with an Aluminum Oxide ($Al_2O_3$) or Zirconium Oxide ($ZrO_2$) solid loading, and followed by a thermal debinding and sintering step. The higher resolution of this process is made possible by the LED light's digital mirror device (DMD) chip and optics used. Lithography-based ceramic manufacturing (LCM) has improved this process making it more accurate with higher resolution (40 µm) and rigidity. The new LCM process involves the selective curing of a photosensitive resin containing homogenously dispersed oxide or glass ceramic particles that can be fabricated at very high resolution due to imaging systems which enable the transfer of layer information by means of ever-improving LED technology.

In 110, post-processing may then be applied. For example, a thermal treatment (for binder burnout) and a sintering process may be applied to achieve optimal or improved ceramic density. For example, the debinding and sintering phase may include removing the green CCAA from the device, exposing the blank to a furnace to decompose the polymerized binder (debinding), and sintering of the ceramic material.

Examples of raw materials of the CCAAs may include powder of high strength oxides, nitrides and carbides ceramics including but not limited to: Aluminum Oxide (Al2O3), Zirconium Oxide (ZrO2), Alumina toughened Zirconia (ATZ), Zirconia-toughened alumina (ZTA), Lithiumdisilicate, Leucitesilicate, Nitrides (e.g. SiN4), and mono- or polycrystalline ceramic. The base of CCAA may be adhered to the tooth surface and the CCAA surface may be matched to matching indentations within the CA. According to requirements of mechanical properties, different composition of material may be required for the layers during the DLP manufacturing process. After being built up, the CCAAs may have a gradient and better performance.

Further, the CCAA surface may be processed based on clinical demand.

In 112, the CCAA is ready to be placed.

Figure 2B:
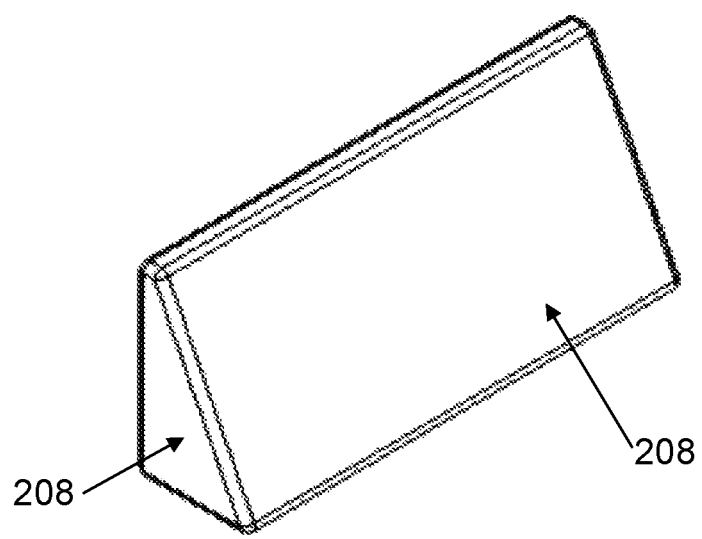

FIGS. 2a and 2b depict an orthodontic attachment, such as a CCAA, where the base 206 of the attachment may be the surface that contacts the tooth and the face 208 of the attachment may include any surface that contacts the aligner.

Typically, the thickness 202 of the CCAA pad 204 may extend less than 2.0 mm for lingual CCAAs and less than 2.5 for labial CCAAs from the surface of the tooth, with a labial and lingual minimum extension of 0.25 mm. The CCAA pad 204 may be adhered to the tooth surface with well-known dental adhesives that may be unfilled dental resins or partially filled dental resins. Depending upon the manufacturing process used, different ceramics or composition of powder may be required for the layers. For example, if a selective laser melting manufacturing process is used, an LED light source may be used for the selective curing of a photosensitive resin containing the oxide or glass ceramic particles. Different layers may use different ceramics or compositions of powder.

Figure 14:
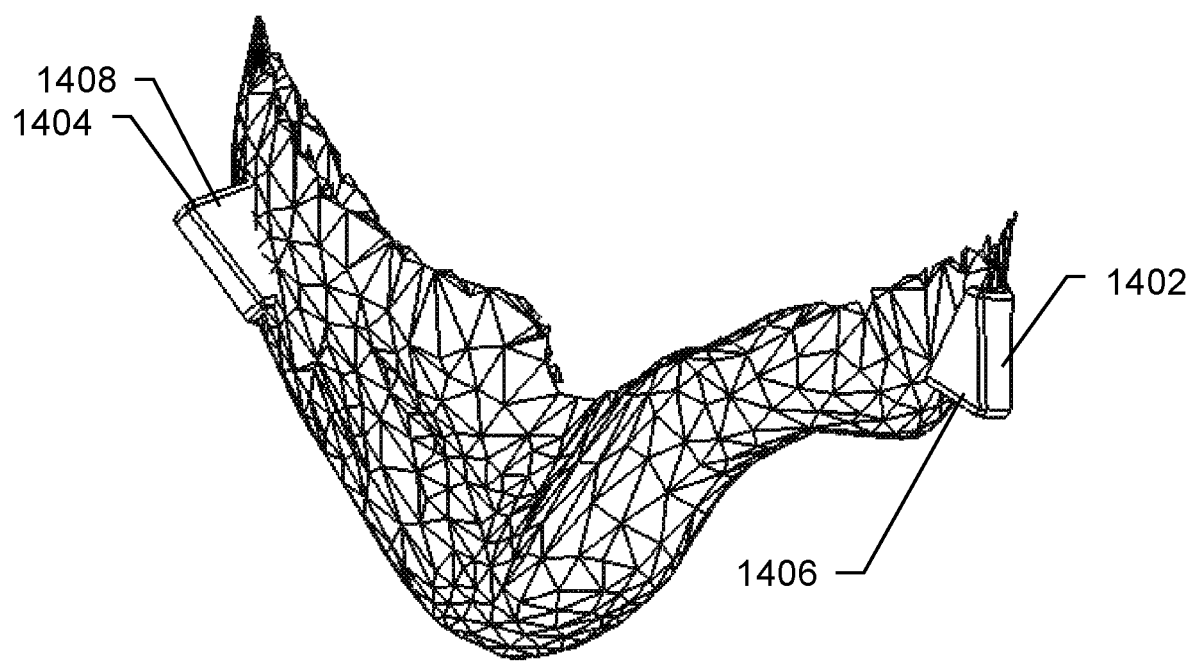
FIG. 14 is an exemplary illustration of an embodiment of orthodontic attachments.

The CCAA pad 204, which holds or connects the CCAA to the tooth surface, may be designed specifically according to the tooth surface profile, instead of a generalized gridding pattern. The customized CCAAs can meet individual case demand, such as increased vertical tracking for upper lateral incisors or for lower premolars to level the curve of Spee or reduce overbite. For example, as shown in FIG. 14, the curve on tooth surface and the designed CCAA, the tooth side of the CCAA (CCAA pad) is matched to the lingual or labial surface of the tooth, for example for lingual CCAA 1402 and labial CCAA 1404. FIG. 14 depicts two orthodontic attachments 1402, 1404 bonded to a tooth where the opposing directions of the attachments aids in creating lingual crown torque tooth and where flipping the axis of the attachments would result in labial crown torque. The specific angle of the retentive edge 1406, 1408 and locations of the attachments optimize the torqueing moment on the tooth. In this example, orthodontic attachment 1402 has −8 degrees of torque and orthodontic attachment 1404 has +8 degrees of torque. The orthodontic aligner may place a force on each retentive end to facilitate the motion. The trapezoidal shape of the aligner may ensure one edge is always acting like a retentive feature to hold the aligner to the arch.

Figure 8A:
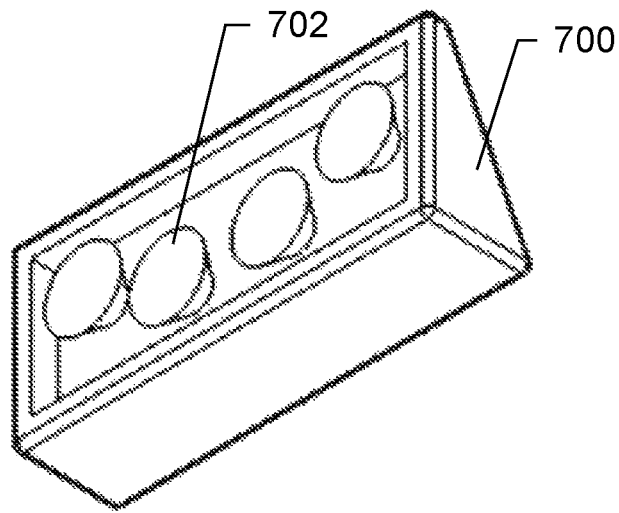
FIGS. 8a and 8b are exemplary illustrations of an embodiment of an orthodontic attachment and retentive features.
Figure 8B:
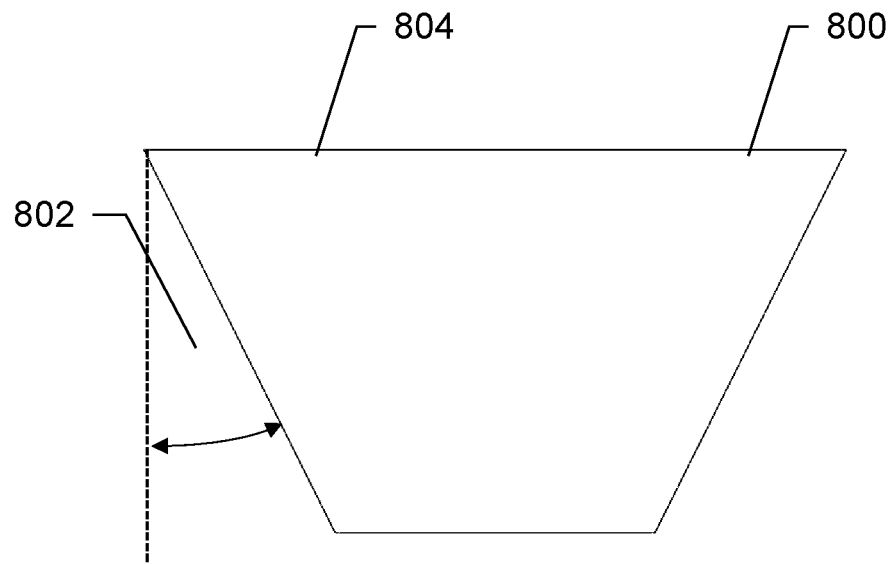

FIG. 8a depicts an example of retentive structures 702 designed into the base of attachment 700 base. These retentive structures 702 may be of any shape that is a three-dimensional FIG. 800 with a positive draft angle 802 greater than 0, as shown in FIG. 8b. Other examples of retentive structures other than semi-lunar cones may include full-circles, squares, rectangles, any variety of retentive lattices or meshes all shapes that at some point would have a positive draft angle and would therefore be more efficiently manufactured via 3DP vs injection molding.

The neutral plane 804 of the draft may be oriented towards the tooth structure and may be flat or itself contoured to the shape of the tooth surface to which it is meant to be bonded. While any degree of retention would achieve the intended retentive interaction with bonding cement, a range of designed draft angles may be utilized to compensate for the limitations of a specific 3D printing process.

Figure 3:
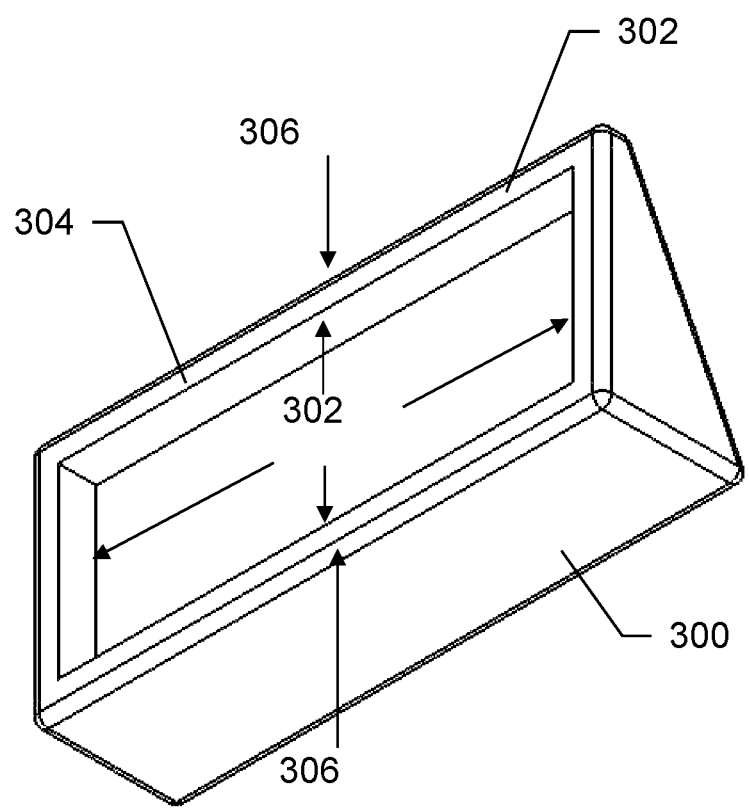
FIG. 3 is an exemplary illustration of an embodiment of an orthodontic attachment.

FIG. 3 depicts a thin fracture wall 302 around the attachment 300 base, which has a thickness 304 of about 10 to about 150 μm, inclusive. Bonding cement may be inserted into the cavity formed by the thin fracture wall. The wall thickness may be consistent around all edges of the attachment enabling a normal force 306 to be applied in any direction (mesial-distal, occlusal-gingival, or to any opposing corners). The continuity of the wall around the entire attachment 300 may enable predictable fracture of the wall via pliers in any direction, enabling debonding of the attachment 300 through a combination of tensile and peeling forces.

Figure 4:
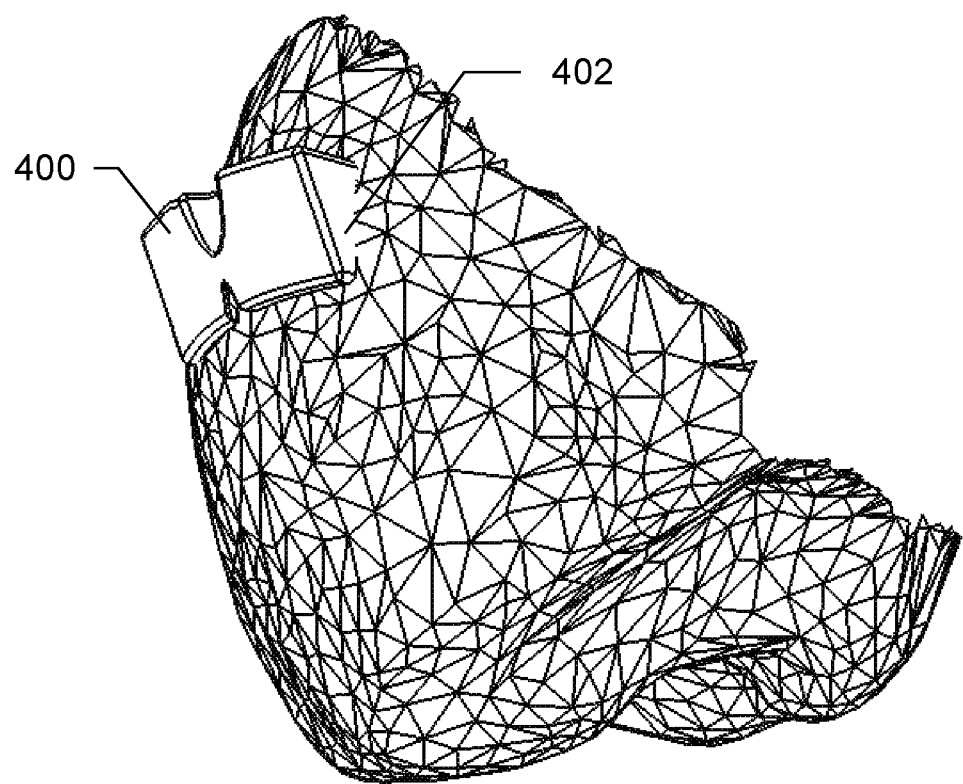
FIG. 4 illustrates an example of a single attachment on a lower premolar molar tooth.

FIG. 4 depicts an attachment 400 with its base 402 contoured to the shape of the tooth. The contouring may match the desired position of the attachment on the tooth. Any changes in the attachment's positioning would reflect changes in the contouring. The base and the face are contoured to the tooth.

Figure 9A:
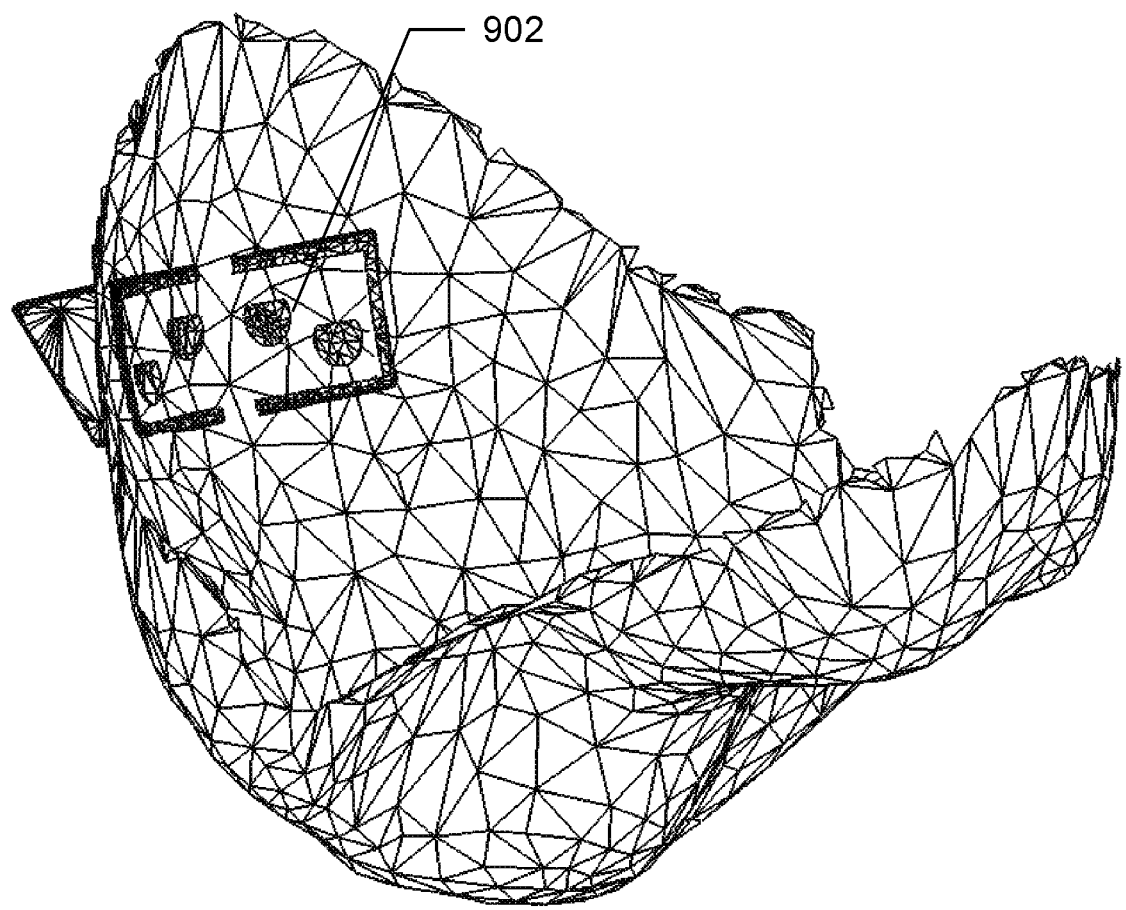
FIGS. 9a and 9b illustrate a base view of an example single attachment with and without retentive structures.
Figure 9B:
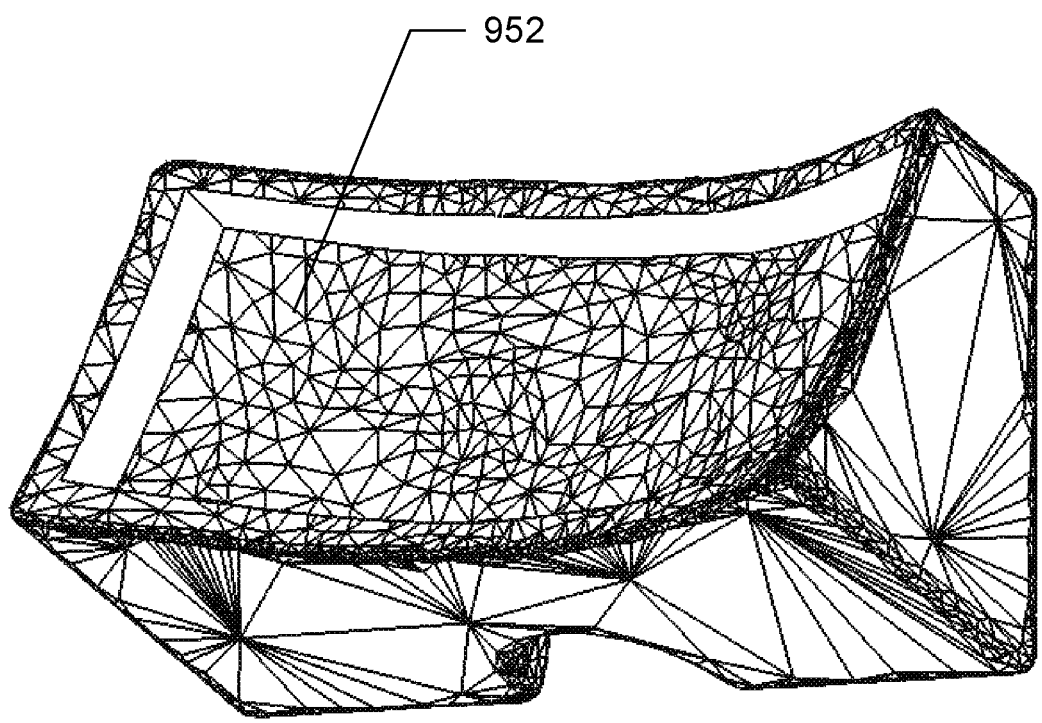

FIG. 9a depicts the retentive structures, such as 902, contoured to the tooth surface looking from the inside of a tooth 3D vector (.stl) shell. Each structure may be contoured to fit its corresponding area of tooth surface within the attachment position. The attachment base cavity 952 shown in FIG. 9b may also be contoured to ensure each retentive structure maintains its dimensions and all structures have a similar depth.

Figure 6A:
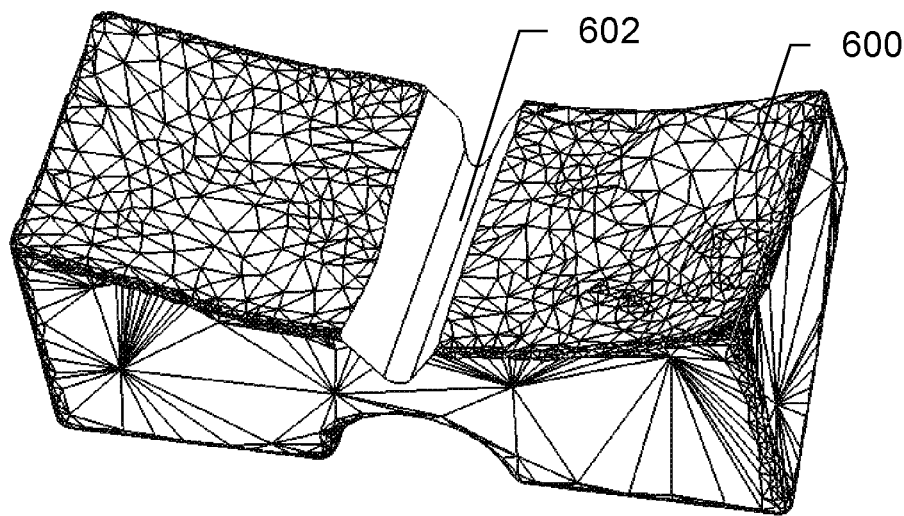
FIGS. 6a, 6b, and 6c are exemplary illustrations of an embodiment of a CCAA with fracture groove.
Figure 6B:
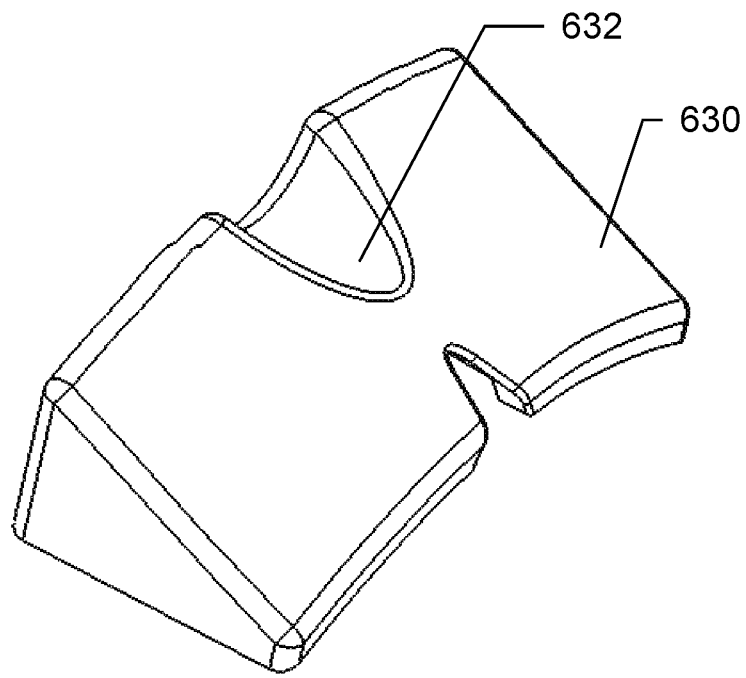
Figure 6C:
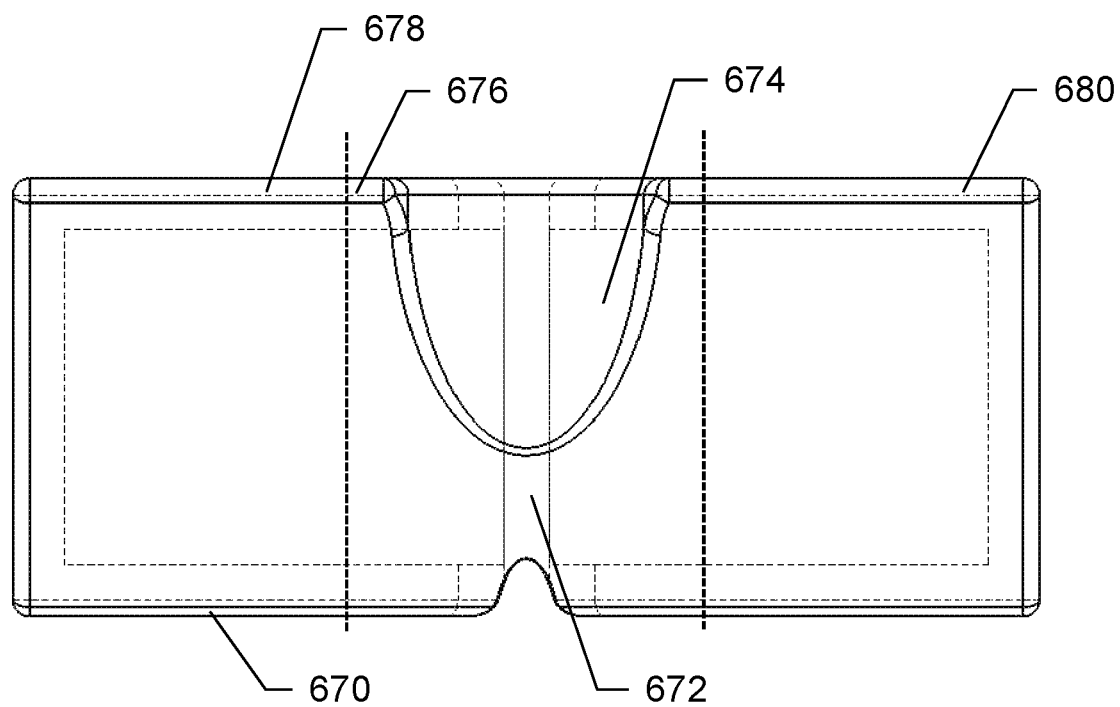

FIG. 6a depicts an example of a fracture groove 602 within the middle vertical third of a ceramic attachment 600 viewed from the attachment's base. FIG. 6b depicts an example of an auxiliary fracture groove 632 within the middle vertical third of a ceramic attachment 630 viewed from the attachment's face. FIG. 6c. depicts the attachment 670 split into thirds with the fracture groove 672 and auxiliary fracture groove 674 within the middle third 676 of the attachment, between the mesial third 678 and distal third 680, viewed from the attachment's face. The respective ratios for the fracture and auxiliary fracture groove distances from the mesial and distal edges may be variable.

Figure 7A:
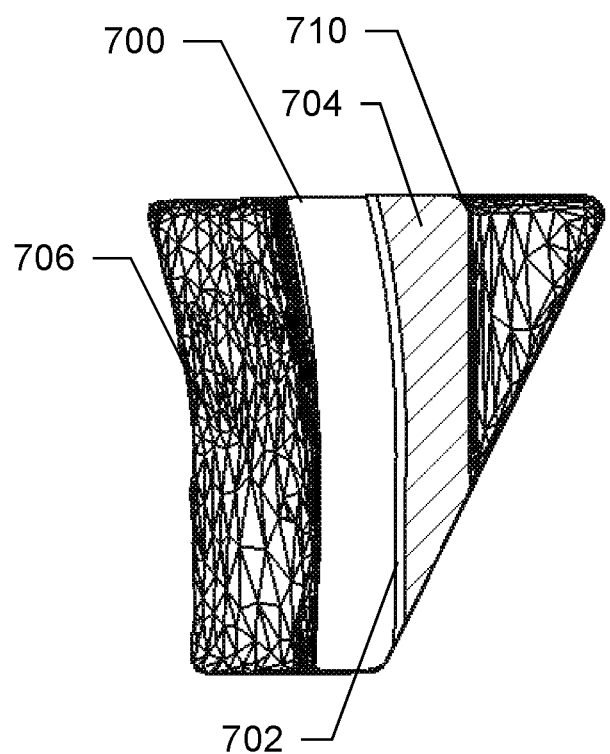
FIGS. 7a and 7b are exemplary illustrations of an embodiment of a CCAA with fracture groove.
Figure 7B:
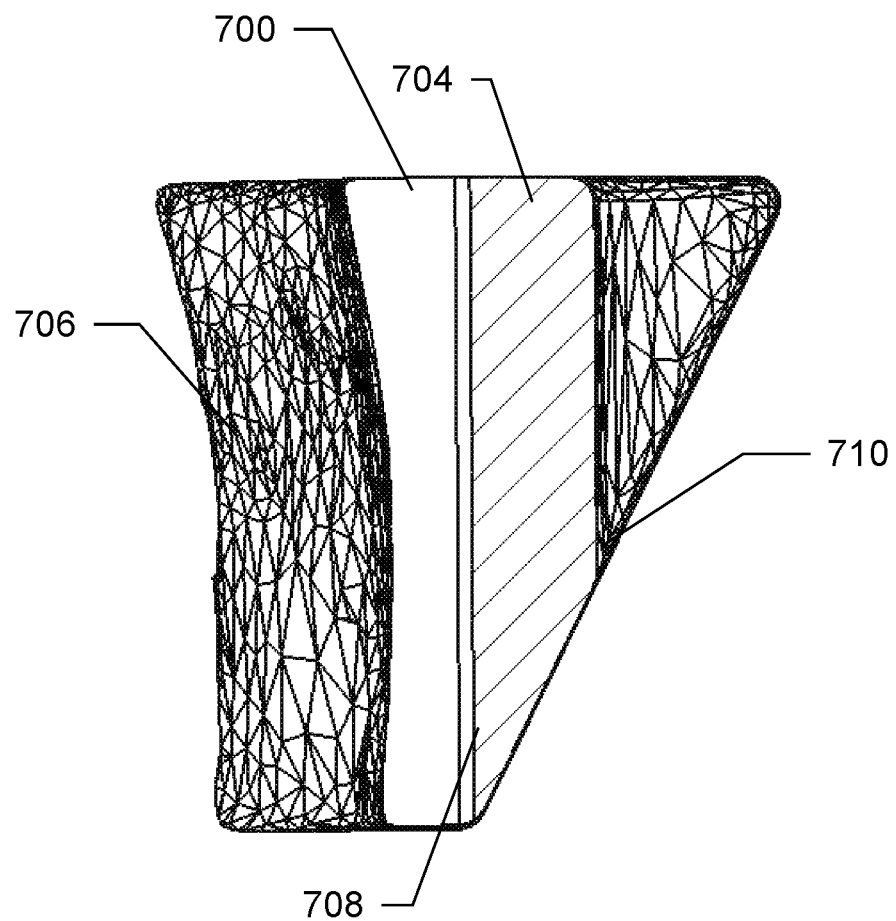

A side view of an exemplary printed CCAA 700 is shown in FIGS. 7a and 7b. The pad 706 of the CCAA may highly match the tooth surface and maximize the tooth contact surface. This may allow for more accurate CCAA placement by the clinician and better bond approximation to the tooth. FIG. 7a depicts the weakened area consisting of a tooth curved depression 702 (fracture groove) in the attachment base running vertically (occlusal-gingival) within the middle third of the attachment, as in FIGS. 6a and 6c. The attachment area 704 between the fracture groove 702, 708 and auxiliary fracture groove 710 features may form the attachment's weakened area.

Finite-element analysis has revealed that mesial-distal forces on the sides of the attachment result in a concentration of forces in the middle third of the attachment base. The groove is defined as the area of removed material from where forces would have been most concentrated. The addition of this "groove" lowers the forces required to predictably create an attachment fracture down the middle vertical third of the attachment, which aids in debonding the ceramic attachment from the tooth. The weakened area, and the fracture force may be optimized by adjusting the dimensions of the fracture groove and/or the auxiliary fracture groove.

As shown in FIG. 7a, groove 702 may be consistent in depth from the tooth surface, matching the contour of the tooth. Likewise, as shown in FIG. 7b, groove 708 may be variable in distance from the tooth surface. In either embodiments, the groove depth may be a nominal value for all attachments or may vary based on the attachment width. In instances where the groove is a nominal value, the groove depth may be in a range of 0.10 mm to 1.0 mm. In instances where the groove depth is variable, it may have a range of 1-50% of the width.

Figure 10:
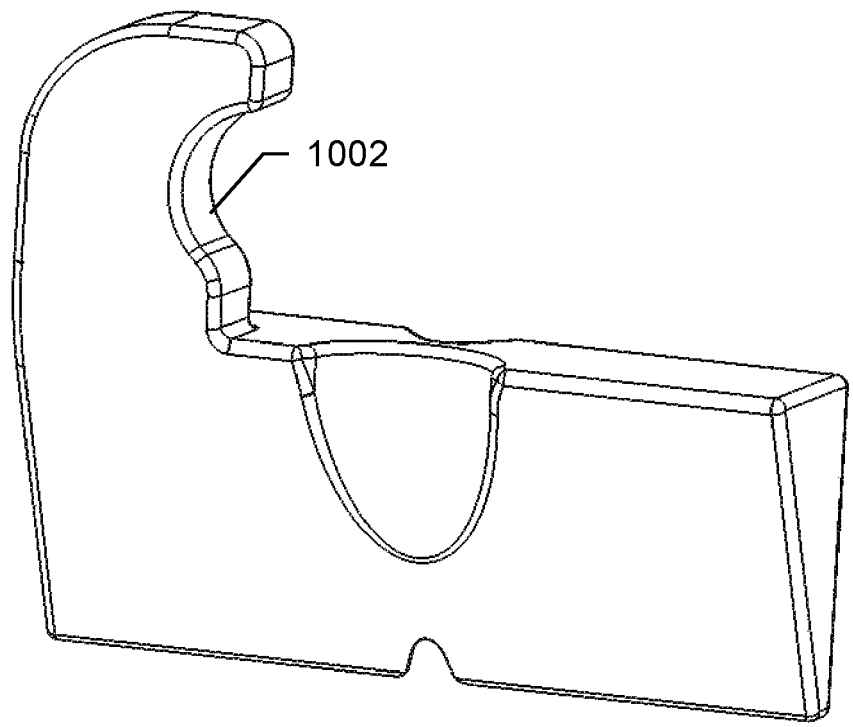
FIG. 10 is an exemplary illustration of an embodiment of an orthodontic attachment.

CCAA 700 may further include an attachment such as a hook 1002, shown in FIG. 10 that provides the capability to use additional delivery systems such as elastomers, springs or other attachments that create vectors of force. The example shown in FIG. 10 depicts an orthodontic attachment with a distal gingival hook. The hook may be used for any form of orthodontic elastics to aid in the treatment of malocclusion. In a number of embodiments, these features may be manufactured as one piece, protruding from any predesigned area to create the proper force vectors desired, and no machining of the features is required to produce a suitable CCAA.

Figure 11A:
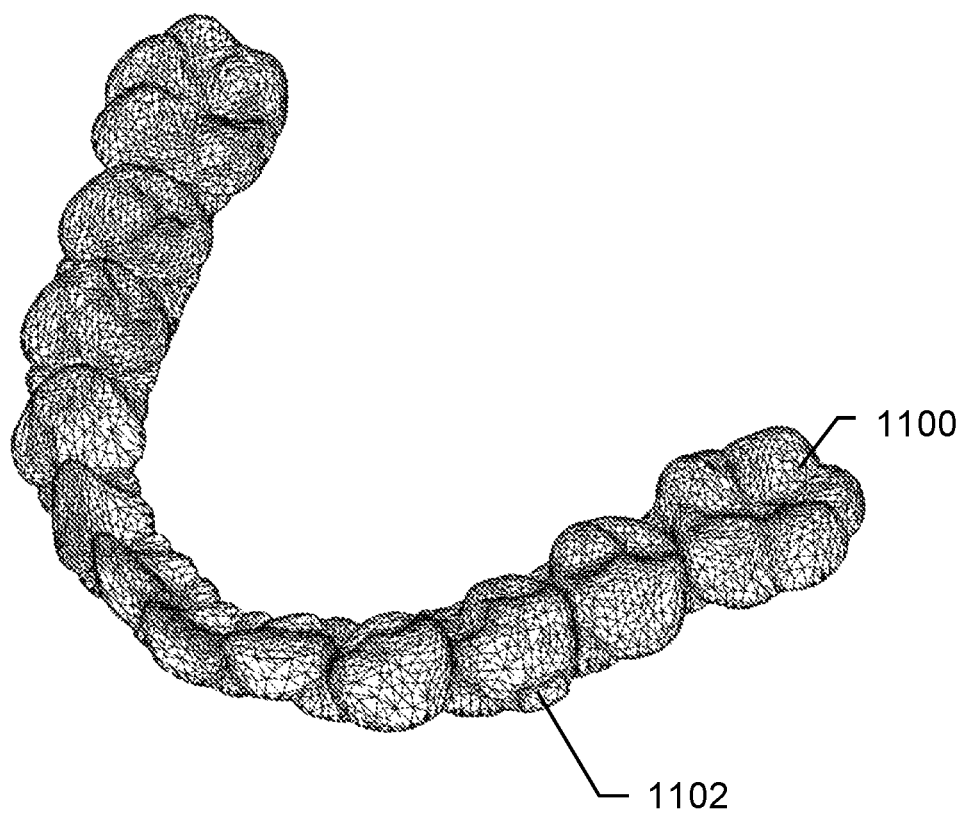
FIGS. 11a, 11b, and 11c are exemplary illustrations of an embodiment of an orthodontic aligner that accommodates an orthodontic attachment.
Figure 11B:
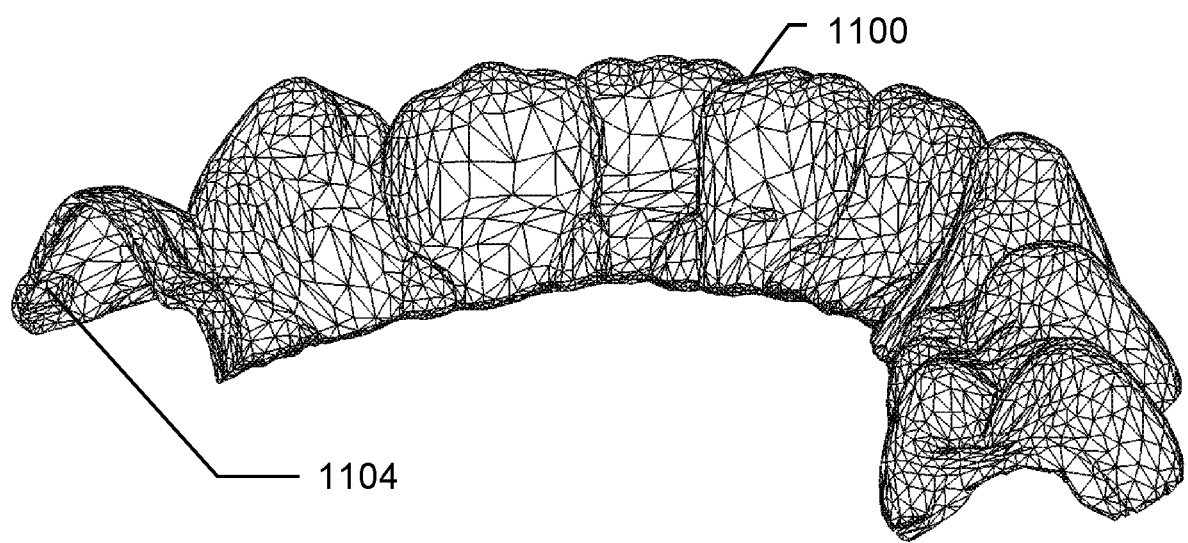
Figure 11C:
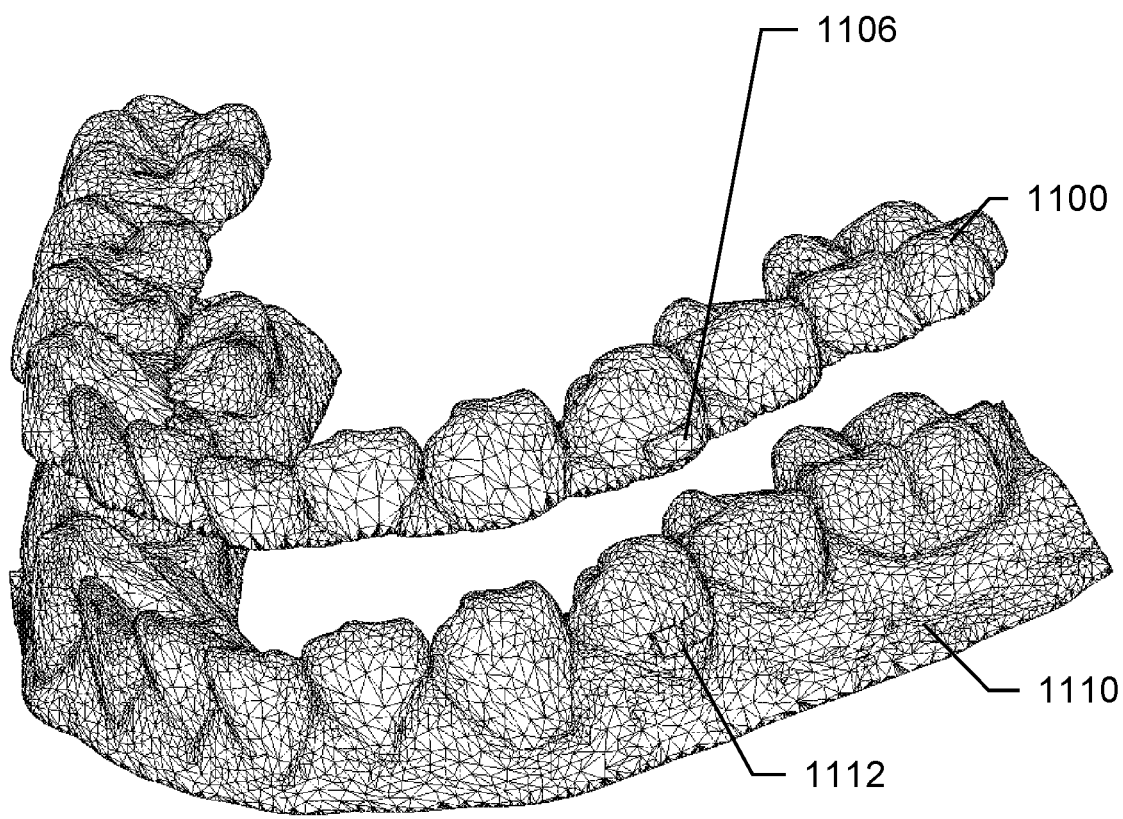
Figure 12A:
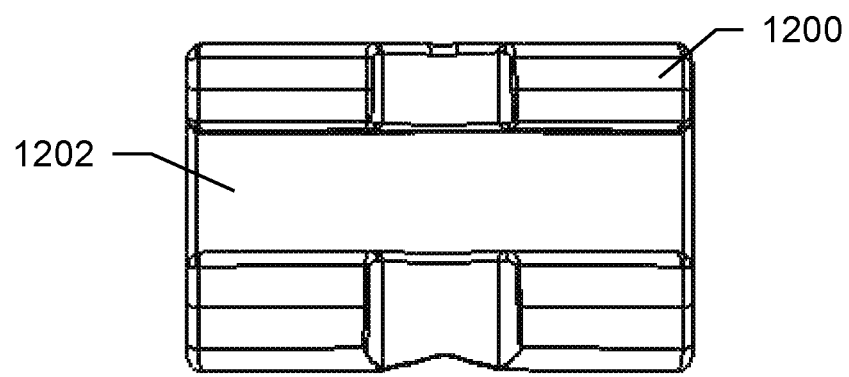
FIGS. 12a, 12b, 12c, 12d, 12e, 12f, 12g, and 12h are exemplary illustrations of an embodiment of an orthodontic attachment bracket.
Figure 12B:
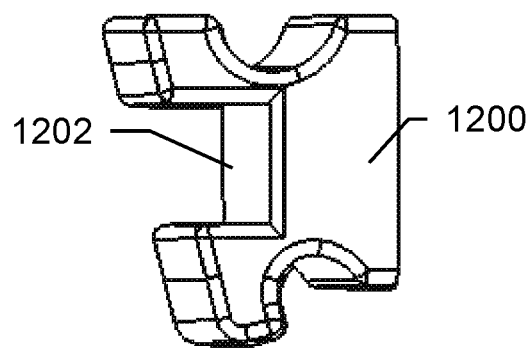
Figure 12C:
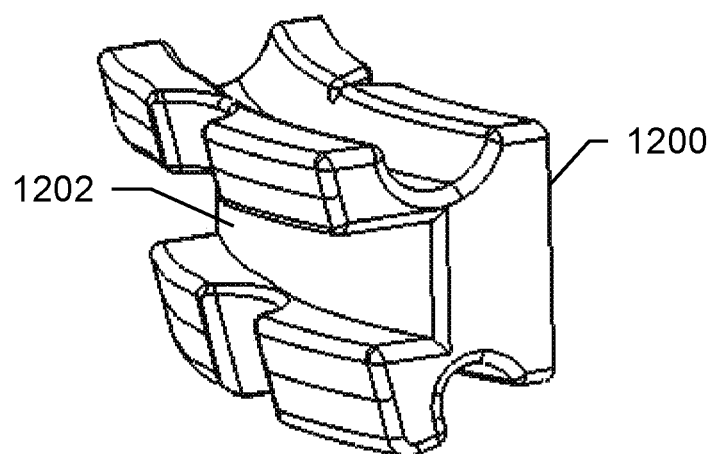
Figure 12D:
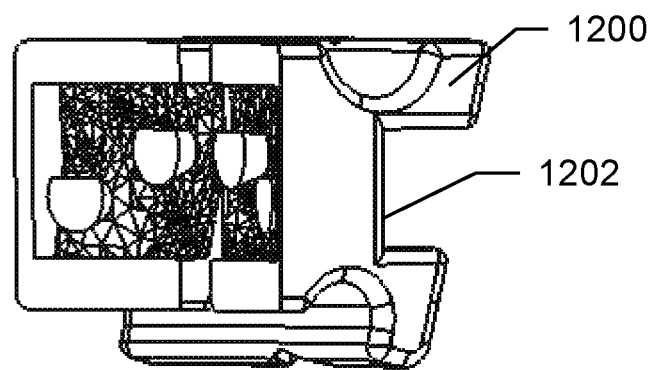
Figure 12E:
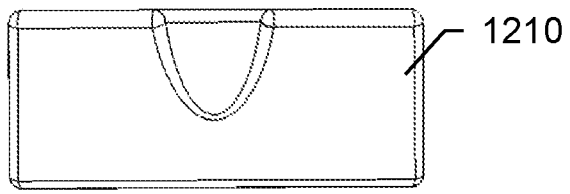
Figure 12F:
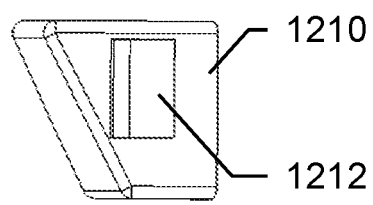
Figure 12G:
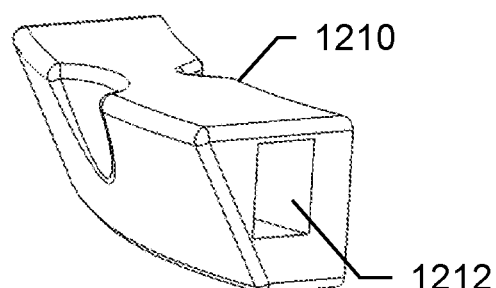
Figure 12H:
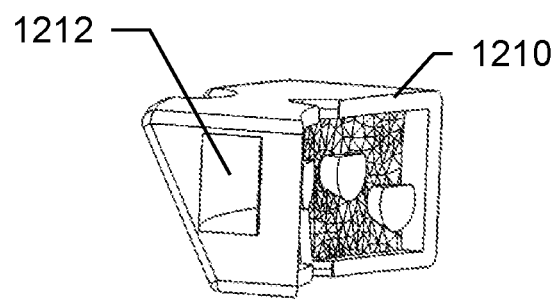

FIGS. 11a, 11b, 11c depict an exemplary orthodontic aligner 1100 that includes an indentation on the outside 1102, inside 1104, and outside 1106 that accommodates an orthodontic attachment with any given shape. Only one exemplary shape is depicted in this image, but the present devices and methods are applicable to any shape. The attachment indentation fits over and completely encases the attachment to aid in movement. The aligner may be easily pulled over the attachment for removal. Also shown in FIG. 11c are digital model 1110 and digital attachment 1112.

FIGS. 12a, 12b, 12c, 12d, 12e, 12f, 12g, and 12h depict exemplary orthodontic attachments that may be used in combination aligner-bracket treatment. FIGS. 12a, 12b, 12c, and 12d depict several views of an exemplary attachment 1200 with a curved slot 1202 that can accommodate a standard orthodontic wire. This example shows a ribbon wire configuration, whereby the archwire is longer vertically than horizontally. FIGS. 12e, 12f, 12g, and 12h depict several views of an exemplary attachment tube 1210 that may be placed on teeth for the purposes of accepting a wire to move teeth with or without a clear aligner. The channel 1212 may pass mesial-distal and may be consistent in cross-sectional measurement, which may be of a circular, rectangular (in this example) or square in cross-sectional design, with square and rectangular cross-sections having slightly rounded corners of a chosen radius. Regardless of the shape, in embodiments, the average cross-section of the tube may be no greater than 0.50 mm².

Figure 13A:
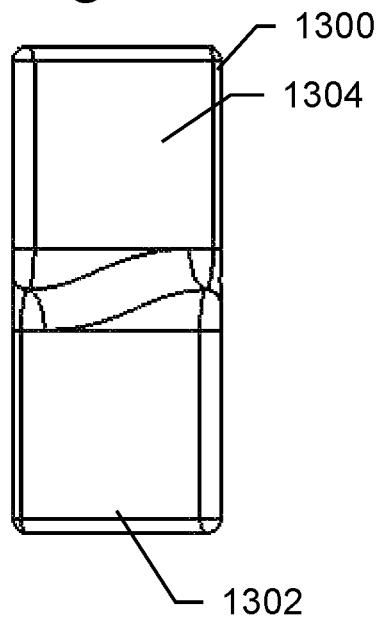
FIGS. 13a, 13b, and 13c are exemplary illustrations of an embodiment of an orthodontic attachment.
Figure 13B:
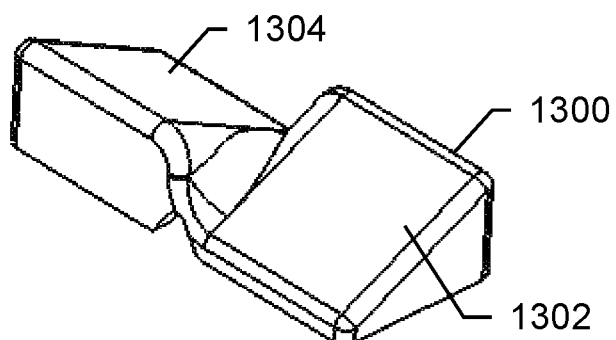
Figure 13C:
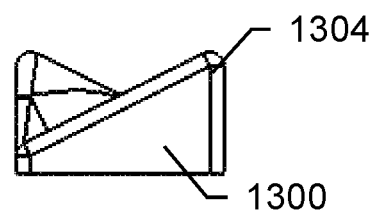

FIG. 13 depicts several views of an exemplary orthodontic attachment 1300 that may be used to aid in tipping, torqueing, or rotating the tooth. Half of the attachment retaining edge 1302 is on one side while the other half 1304 is on the opposing side. The location and angle the attachment is placed on the tooth may determine the force placed on each retaining edge. This action may not only aid in tooth movement but may remain an active measure in retaining the aligner on the arch.

Using the ceramic slurry-based AM technique can turn the designed model into a ceramic product rapidly. The CCAA manufacturing involves few steps and can be done on site, saving time and cost.

The described techniques may be used to manufacture CCAAs from various Oxide ceramics and light-curable materials such as Aluminum Oxide ($Al_2O_3$) and Zirconium Oxide ($ZrO_2$).

Many patients desire a CCAA that matches the color of the tooth to which the CCAA is attached. As another example, embodiments of the present invention may provide the capability to produce translucent CCAAs, which may provide still improved appearance. Additionally, embodiments of the present invention may provide the capability to produce CCAAs in a shade closely matched to the patient's tooth shades, which may be the same shade or matched to individual teeth as the tooth shades vary.

The described techniques may be made cost-effective to the point where an individual orthodontic practice could purchase the required equipment and software.

Ceramic slurry-based AM has many advantages for orthodontic CCAA fabrication over selective laser sintering/melting (SLM) which uses thermal energy, and 3-D printing (3DP) systems that use a binder and polymer-derived ceramics (PDCs). For example, ceramic slurry-based AM may provide higher surface quality, better object resolution, and improved mechanical properties. PDCs structured using light in a stereolithographic or mask exposure process may also be used as a ceramic AM method for CCAA fabrication.

Custom lingual CCAAs may be fabricated by this method, which may receive a pre-bent customized archwire as described by US 2007/0015104 A1. Custom labial CCAAs may also receive pre-bent wires.

The procedure for the layering additive manufacturing (AM) methodology of the labial/lingual orthodontic CCAAs by ceramic slurry-based Amiss as follows.

An example of ceramic slurry-based AM is the lithography-based digital light processing (DLP) technique described in U.S. Pat. No. 8,623,264 B2, which is incorporated herein by reference, but may be briefly summarized as follows: a light-polymerizable material, the material being located in at least one trough, having a particularly light-transmissive, horizontal bottom, is polymerized by illumination on at least one horizontal platform, the platform having a pre-specified geometry and projecting into a trough, in an illumination field, wherein the platform is displaced vertically to form a subsequent layer, light-polymerizable material is then added to the most recently formed layer, and repetition of the foregoing steps leads to the layered construction of the orthodontic CCAA in the desired prescription/mold, which arises from the succession of layer geometries determined from the CAD software. The trough can be shifted horizontally to a supply position, and the supply device brings light-polymerizable material at least to an illumination field of the trough bottom, before the at least one trough is shifted to an illumination position in which the illumination field is located below the platform and above the illumination unit, and illumination is carried out, creating a "green CCAA".

The light-polymerizable material or photo-reactive suspension (slurry) can be prepared based on commercially available di- and mono-functional methacrylates. An example material might be a slurry blend of 0.01-0.025 wt % of a highly reactive photoinitiator, 0.05-6 wt % a dispersant, an absorber, and 2-20 wt % of a non-reactive diluent. A solid loading of high strength Oxide ceramics such as Aluminum Oxide ($Al_2O_3$) and Zirconium Oxide ($ZrO_2$) powder can be used, but this process may extend to other ceramic materials.

Figure 15:
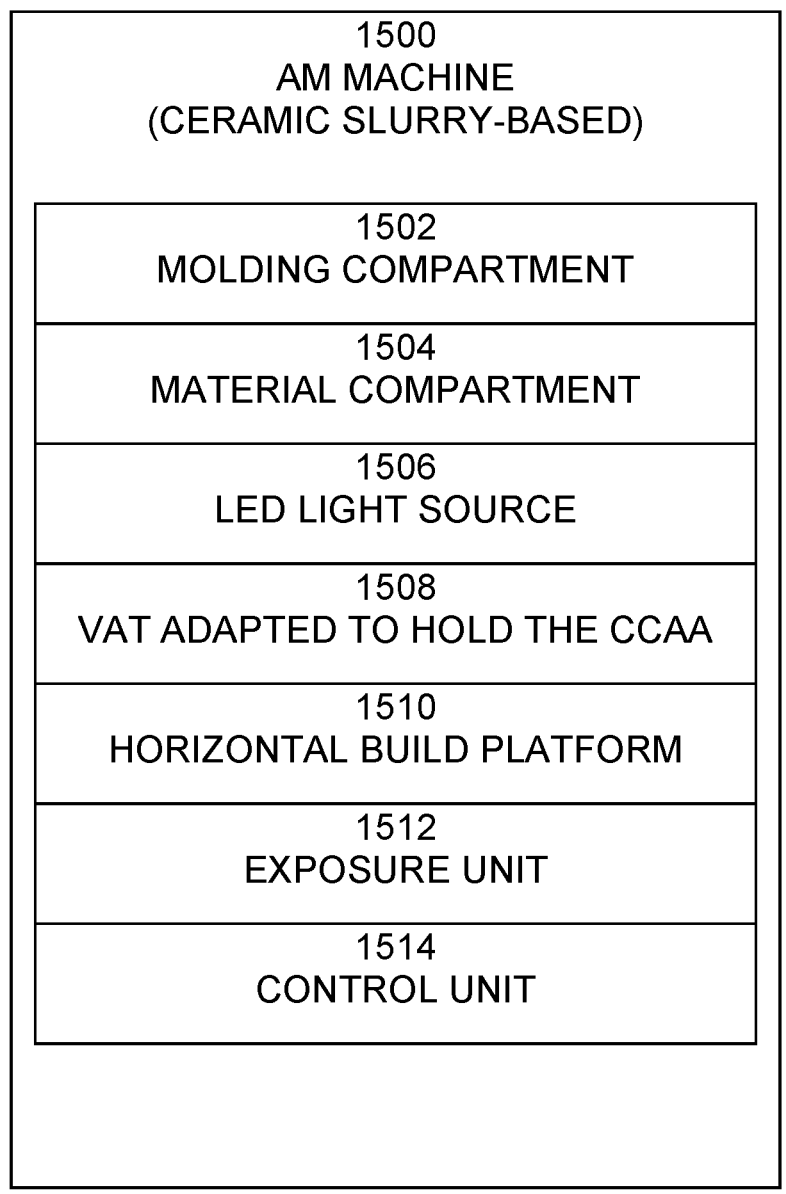
FIG. 15 is an exemplary block diagram of an embodiment of a ceramic slurry-based AM machine.

FIG. 15 is an exemplary block diagram of an embodiment of a ceramic slurry-based AM machine 1500. In embodiments, the ceramic slurry-based AM machine 1500 may comprise a molding compartment 1502 comprising a horizontal build platform 1510 and a plunger to directly produce the CCAA by layer manufacturing, a material compartment 1504, and an LED light source 1506 for digital light processing, wherein the CCAA is produced by layer manufacturing using slicing software to separate the 3D CAD CCAA structure model into layers and to get a horizontal section model for each layer so that a shape of each layer produced by the ceramic slurry-based AM machine is consistent with the 3D CAD structure data. In embodiments, the ceramic slurry-based AM machine 1500 may comprise a vat adapted to hold the CCAA 1508 during manufacturing, a horizontal build platform 1510 adapted to be held at a settable height above the vat bottom, an exposure unit 1512, adapted to be controlled for position selective exposure of a surface on the horizontal build platform with an intensity pattern with predetermined geometry, a control unit 1514, adapted to receive the 3D CAD CCAA structure model and, using the 3D CAD CCAA structure model to: polymerize in successive exposure steps layers lying one above the other on the build platform 1510, respectively with predetermined geometry, by controlling the exposure unit, and to adjust, after each exposure step for a layer, a relative position of the build platform 1510 to the vat 1508 bottom, to build up the object successively in the desired form, which results from the sequence of the layer geometries. The exposure unit 1512 may further comprise a laser as a light source, a light beam of which successively scans the exposure area by way of a movable mirror controlled by the control unit.

An exemplary block diagram of a computer system 500, in which the processes shown above may be implemented, is shown in FIG. 5. Computer system 500 is typically a programmed general-purpose computer system, such as a personal computer, workstation, server system, and minicomputer or mainframe computer. Computer system 500 includes one or more processors (CPUs) 502A-502N, input/output circuitry 504, network adapter 506, and memory 508. CPUs 502A-502N execute program instructions in order to carry out the functions of embodiments of the present invention. Typically, CPUs 502A-502N are one or more microprocessors, such as an INTEL PENTIUM® processor.

Figure 5:
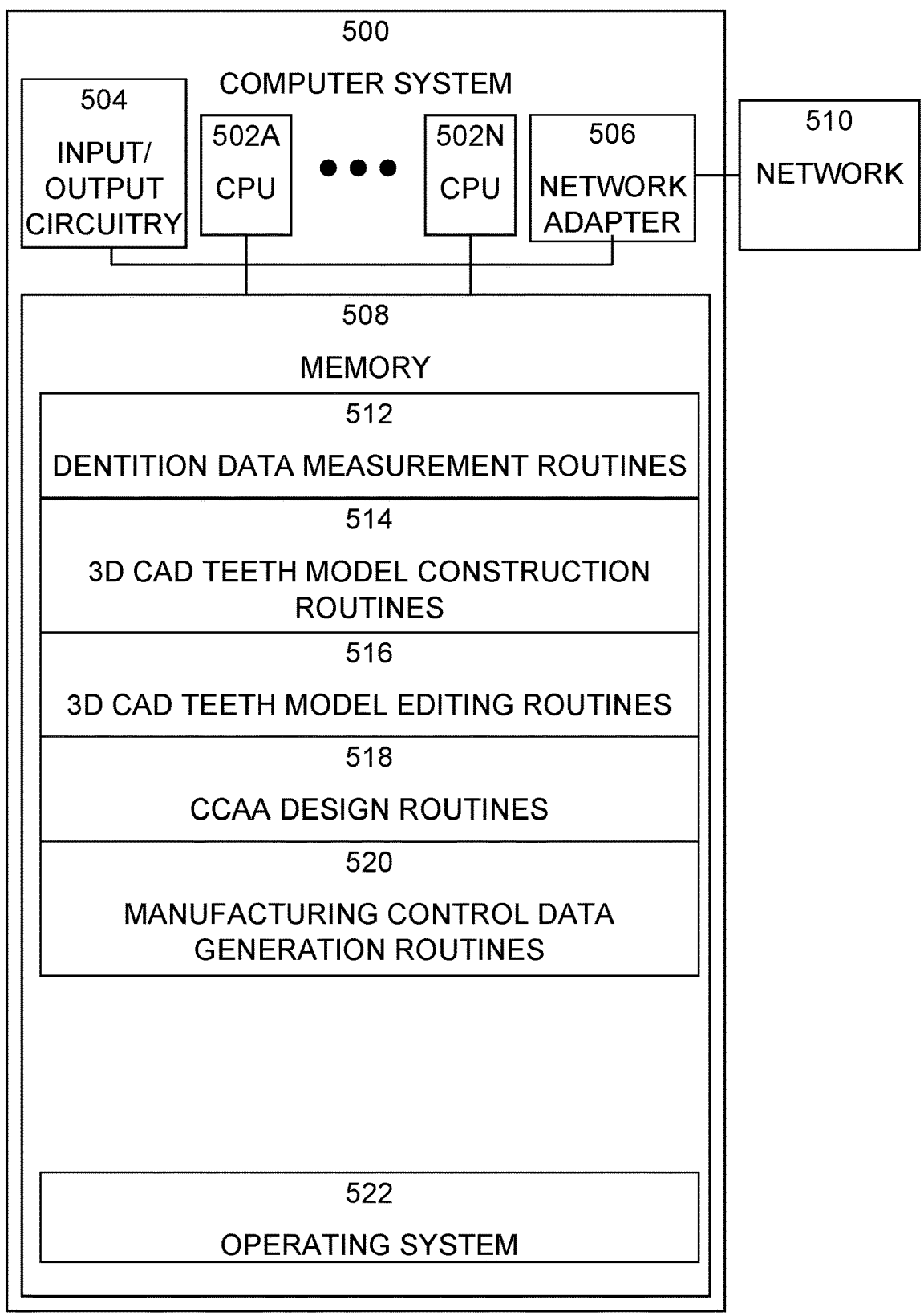
FIG. 5 is an exemplary block diagram of a computer system in which embodiments of the present systems and method may be implemented.

FIG. 5 illustrates an embodiment in which computer system 500 is implemented as a single multi-processor computer system, in which multiple processors 502A-502N share system resources, such as memory 508, input/output circuitry 504, and network adapter 506. However, the present invention also contemplates embodiments in which computer system 500 is implemented as a plurality of networked computer systems, which may be single-processor computer systems, multi-processor computer systems, or a mix thereof.

Input/output circuitry 504 provides the capability to input data to, or output data from, computer system 500. For example, input/output circuitry may include input devices, such as keyboards, mice, touchpads, trackballs, scanners, etc., output devices, such as video adapters, monitors, printers, etc., and input/output devices, such as, modems, etc. Network adapter 506 interfaces computer system 500 with a network 510. Network 510 may be any public or proprietary LAN or WAN, including, but not limited to the Internet.

Memory 508 stores program instructions that are executed by, and data that are used and processed by, CPU 502 to perform the functions of computer system 500. Memory 508 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 508 varies depending upon the function that computer system 500 is programmed to perform. In the example shown in FIG. 5, memory contents that may be included in a system in which a content analysis platform is implemented are shown. However, one of skill in the art would recognize that these functions, along with the memory contents related to those functions, may be included on one system, or may be distributed among a plurality of systems, based on well-known engineering considerations. Embodiments of the present invention contemplate any and all such arrangements.

In the example shown in FIG. 5, memory 508 may include dentition data measurement routines 512, 3D CAD teeth model construction routines 514, 3D CAD teeth model editing routines 516, CCAA design routines 518, manufacturing control data generation routines 520, and operating system 522. Dentition data measurement routines 512 may obtain and process dentition data, such as may be generated by CT layer scanning or a non-contact 3D scanner directly on the patient's teeth, or uses 3D readings on the teeth model previously cast. 3D CAD teeth model construction routines 514 may construct a 3D CAD model of the measured teeth based on the dentition data. 3D CAD teeth model editing routines 516 may be used to re-arrange the teeth in the model to the desired treatment outcomes and may additionally be used to accept additional information, such as the desired torque, offset, angulation of select CCAAs and occlusal/incisal coverage for placement guide. CCAA design routines 518 may be used to design and generate a 3D CAD model based on the input 3D CAD model of the measured teeth, the model of the desired treatment outcomes, and the input additional information. Manufacturing control data generation routines 520 may be used to generate manufacturing control data for use by the production equipment. Operating system 522 provides overall system functionality.

As shown in FIG. 5, an embodiment of the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

It is important to note that while aspects of the present invention may be implemented in the context of a fully functioning data processing system, those of ordinary skill in the art will appreciate that the processes of an embodiment of the present invention are capable of being distributed in the form of a computer program product including a computer readable medium of instructions. Examples of non-transitory computer readable media include storage media, examples of which include, but are not limited to, floppy disks, hard disk drives, CD-ROMs, DVD-ROMs, RAM, and, flash memory.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of manufacturing pre-formed, patient-specific, customized, ceramic, labial/lingual orthodontic clear aligner attachments (CCAA) by additive manufacturing (AM), said method comprising:
measuring dentition data of a profile of teeth of a patient;
based on the dentition data, creating a three dimensional computer-assisted design (3D CAD) model of the patient's teeth using reverse engineering, and saving the 3D CAD model;
designing a 3D CAD structure model for one or more CCAA on various parts of each tooth;

importing data related to the 3D CAD CCAA structure model into a ceramic slurry-based AM machine;

directly producing the CCAA in the ceramic slurry-based AM machine by layer manufacturing to form a CCAA to be used with an indirect bonding method, and the patient-specific CCAA are adapted to the patient's teeth;

wherein the 3D CAD CCAA structure model includes data representing at least a) the CCAA base (bonding area) that has recesses and/or undercuts into the bonding surface of the CCAA that are custom-shaped to fit the negative of a labial/lingual tooth surface, and contact a particular area of a tooth surface, b) fracture wall or grooves, c) a CCAA material, d) the particular tooth's profile, and e) a CCAA guide or indirect bonding jig to guide 3-dimensional placement of the CCAA onto the tooth, and wherein the thickness of the manufactured layers is from 5 to 100 micrometers (μm) based on the resolution requirements of the CCAA for proper retention to the clear aligner.

2. The method of claim 1, wherein the additive manufacturing machine uses a slurry-based process.

3. The method of claim 2, wherein the slurry-based process includes at least one of lithography-based manufacturing, inkjet printing, slip casting, laser lithography additive manufacturing, direct light processing, and selective laser melting.

4. The method of claim 1, wherein the CCAA is made of an inorganic material with at least one component selected from a group of materials consisting of an oxide ceramic, a nitride ceramic, a carbide ceramic, Aluminum Oxide (Al2O3), Zirconium Oxide (ZrO$_2$), Alumina-toughened Zirconia (ATZ), Zirconia-toughened alumina (ZTA), Lithium disilicate, Leucite silicate and Silicon Nitride.

5. The method of claim 1, wherein the 3D CAD CCAA structure model includes data defining a fracture wall around a perimeter of a base of the CCAA.

6. The method of claim 5, wherein the fracture wall has a thickness of 10-150 μm, inclusive.

7. The method of claim 6, wherein the fracture wall is adapted provide predictable fracture of the wall upon application of the normal force, enabling debonding of the CCAA through a combination of tensile and peeling forces.

8. The method of claim 7, wherein the normal force is applied in at least one of a mesial-distal direction, an occlusal-gingival direction, or to any opposite corners.

9. The method of claim 8, wherein the combination of tensile and peeling forces is less than a shear bond strength of a bonded CCAA.

10. The method of claim 1, wherein the ceramic slurry-based AM machine comprises:

a molding compartment comprising a platform and a plunger to directly produce the CCAA by layer manufacturing;

a material compartment; and an LED light source for digital light processing, wherein the CCAA is produced by layer manufacturing using slicing software to separate the 3D CAD CCAA structure model into layers and to get a horizontal section model for each layer so that a shape of each layer produced by the ceramic slurry-based AM machine is consistent with the 3D CAD structure data.

11. The method of claim 1, wherein the ceramic slurry-based AM machine comprises:

a vat adapted to hold the CCAA during manufacturing;

a horizontal build platform adapted to be held at a settable height above the vat bottom;

an exposure unit, adapted to be controlled for position selective exposure of a surface on the horizontal build platform with an intensity pattern with predetermined geometry;

a control unit, adapted to receive the 3D CAD CCAA structure model.

12. The method of claim 11, wherein the exposure unit further comprises a laser as a light source, a light beam of which successively scans the exposure area by way of a movable mirror controlled by the control unit.

13. The method of claim 11, further comprising:

polymerizing in successive exposure steps layers lying one above the other on the horizontal build platform, respectively with predetermined geometry, by controlling the exposure unit in accordance with the 3D CAD CCAA structure model, and adjusting, after each exposure step for a layer, a relative position of the horizontal build platform to the vat bottom, to build up the object successively in the desired form, which results from the sequence of the layer geometries.

14. The method of claim 1, wherein directly producing the CCAA by layer manufacturing further comprises:

in the ceramic slurry-based AM machine, which comprises:

a vat with an at least partially transparently or translucently formed horizontal bottom, into which light polymerizable material can be filled, a horizontal build platform adapted to be held at a settable height above the vat bottom, an exposure unit adapted to be controlled for position selective exposure of a surface on the build platform with an intensity pattern with predetermined geometry, comprising a light source refined by micromirrors to more precisely control curing, and a control unit.

15. The method of claim 14, wherein the exposure unit further comprises a laser as a light source, a light beam of which successively scans the exposure area by way of a movable mirror controlled by the control unit.

16. The method of claim 15, wherein a scanning accuracy (trueness, per tooth) is less than 0.025 mm and the precision is less than 0.100 mm.

17. The method of claim 14, wherein a manufacturing accuracy in the z-axis of the ceramic slurry-based AM machine is from 5 to 60 μm and wherein the accuracy is achieved by using a between layer additive error compensation method based on a calculated amount of polymerization shrinkage, to prevent errors in the CCAA base morphology.

18. The method of claim 14, wherein manufactured layers of the CCAA comprise a material selected from the group consisting of high strength oxide ceramics including Aluminum Oxide (Al$_2$O$_3$) and Zirconium Oxide (ZrO$_2$) and may be mono- or polycrystalline filled ceramic.

19. The method according to claim 14, wherein the CCAA is less than 3.00 mm thick from the nearest tooth bonding surface to its outer edges.

20. The method of claim 14, further comprising:

polymerizing, as controlled by the control unit, in successive exposure steps layers lying one above the other on the build platform by:

controlling the exposure unit so as to selectively expose a photo-reactive slurry in the vat, adjusting, after each exposure for a layer, a relative position of the horizontal build platform to the vat bottom, and building up the CCAA successively in the desired form, resulting from the sequence of the layer geometries.

21. The method of claim 1, wherein the 3D CAD model is saved as a 3D vector file format.

* * * * *